Patented May 12, 1942

2,282,557

UNITED STATES PATENT OFFICE 2,282,557

SYNTHETIC OILS

Herman A. Bruson, Philadelphia, Pa., assignor to The Resinous Products & Chemical Company, Philadelphia, Pa.

No Drawing. Application May 9, 1940, Serial No. 334,169

14 Claims. (Cl. 260—410)

This invention relates to condensation products obtained by heating an esterified phenol having at least one acyloxymethyl group attached to the aromatic nucleus, and an ester of a poly unsaturated carboxylic acid, particularly one derived from the hydrolysis of a drying oil or which contains a system of conjugated double bonds in the acid radical. It also relates to a process for preparing these compounds.

In copending application Serial No. 272,804 filed May 10, 1939, it is shown that tertiary aminomethyl phenols obtained by condensing a phenol, formaldehyde and a secondary amine are converted to acyloxymethyl phenol esters by heating them with the anhydride of a monocarboxylic acid. An example of this type of esterified phenol is 2,4,6 tris-(acetoxymethyl)-phenyl acetate having the formula—

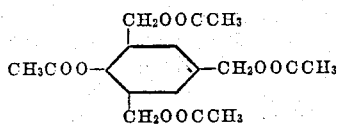

It has now been found that when these esterified phenols having an acyloxymethyl group attached to the aromatic nucleus are heated with an ester of a poly-unsaturated acid, particularly acids derived from drying and semi-drying oils, the acyl radical attached to the methylene group is replaced by the ester of the unsaturated acid, the reaction presumably taking place in the chain of the unsaturated acid radical since its esterified carboxyl group remains intact. The exact nature of the condensation and the position in the acid radical at which it takes place are unknown. The resulting products are usually thick, pale oils and those which are made from drying oil acid esters retain their ability to dry by oxidation when exposed to the air.

The aromatic nucleus of the esterified phenol may be mono- or polycyclic and in the latter case may be a condensed ring system or separate rings joined by a carbon, sulfur, or oxygen bridge. The aromatic nucleus may also have other substituents such as alkyl, aryl, aralkyl, cycloalkyl, alkoxy and carboxy radicals or halogen atoms. The acyl radical of the acyloxymethyl group is derived from a monobasic acid, preferably an aliphatic acid having less than eight carbon atoms. The acyloxy radical which is attached directly to the nucleus may be monobasic or polybasic. In the latter case all of the carboxyl groups of the acid are esterified by the phenol. The preferred compounds are those in which the aromatic nucleus is selected from the benzene, diphenyl or naphthalene series having one or more esterified phenolic hydroxyl groups.

The following compounds are typical of those which may be employed according to the invention:

2,4,6-tris-(acetoxymethyl)-phenyl acetate

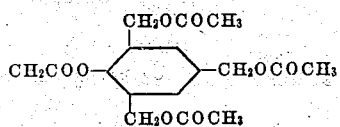

2,4,6-tris-(acetoxymethyl)-m-cresyl-acetate

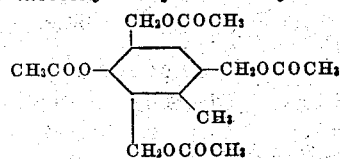

3 - (acetoxymethyl) - 4,4' - bis - (acetoxy) - diphenyl dimethyl methane

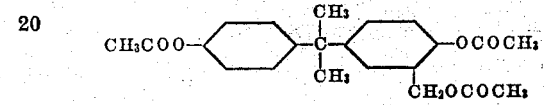

2,5-bis-(acetoxymethyl)-1,4-diacetoxybenzene

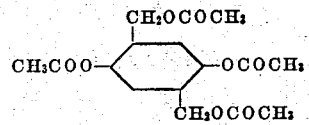

3-(acetoxymethyl)-4-acetoxydiphenyl

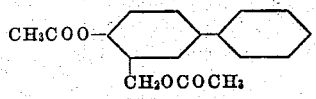

1-(acetoxymethyl)-2-acetoxy-naphthalene

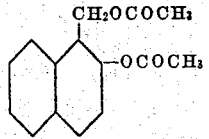

3,5 - bis - (acetoxymethyl) - 4 - acetoxyphenyl isobutane

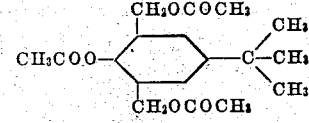

Bis-(2,2'-acetoxymethylphenyl)-succinate

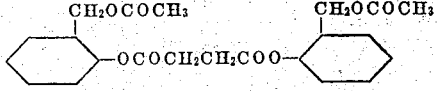

2-acetoxymethyl-phenyl stearate

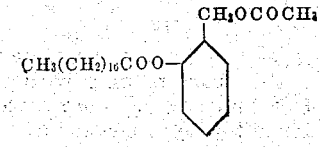

Bis-(2,2'-acetoxymethylphenyl)-phthalate

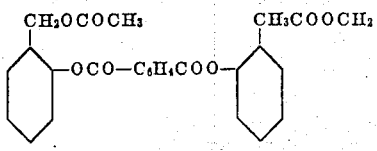

2-acetoxymethyl-phenyl oleate

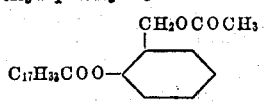

2,6-bis-(benzoyloxymethyl)-p-cresyl benzoate

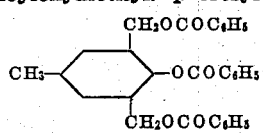

2,6 - bis - (acetoxymethyl)-4-benzyl-phenyl acetate

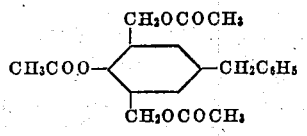

2-propionyloxymethyl-phenyl crotonate

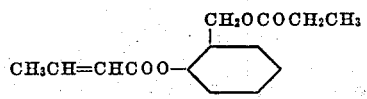

3,5,3',5'-tetra-(acetoxymethyl) - 4,4' - bis - (acetoxy)-diphenyl di-methyl methane

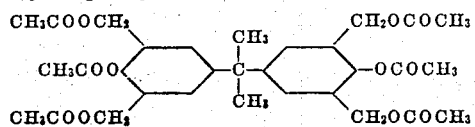

3-(acetoxymethyl)-4,4'- bis - acetoxy - benzophenone

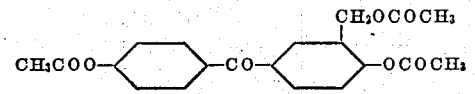

3-(acetoxymethyl)-4,4'-bis-acetoxy diphenyl sulfone

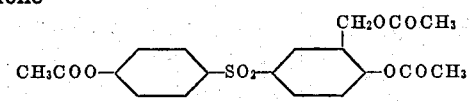

3-(acetoxymethyl)-4,4'-bis-acetoxy diphenyl cyclohexane

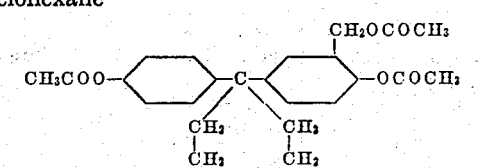

3,5-bis-(acetoxymethyl)-4-acetoxy-butyl benzoate

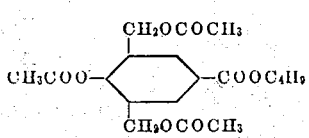

The esters of the poly unsaturated acids which condense in the above manner with the esterified phenols having one or more acyloxymethyl groups attached to the aromatic nucleus may be derived from mono- or polyhydric alcohols such as methyl, ethyl, propyl, butyl, amyl, benzyl, cyclohexyl, etc. alcohols, or glycols, glycerine and other polyhydric alcohols.

The poly unsaturated acid radicals of these esters may be obtained from various drying oils such as linseed, tung, oiticica, soya bean, sunflower, perilla, rapeseed, or fish oils, etc. The unsaturated acids obtained by the catalytic dehydration of ricinoleic acid may also be esterified with alcohols of the types listed above and the resulting esters condensed with compounds of the above general formula.

The reaction is generally carried out by heating the reactants at 200 to 300° C. while stirring until the evolution of the acid corresponding to the acyl radical attached to the methylene group has ceased. The condensation is accelerated by small amounts of oxides, hydroxides or alkoxides of the alkali and alkaline earth metals, oxides of heavy metals, halides of amphoteric metals, higher fatty acids, rosin, etc. Small amounts, 0.5 to 1.0% of sodium ethylate, zinc oxide, litharge, zinc chloride or rosin cause the condensation to proceed more rapidly at lower temperatures, 175° to 200° C.

The proportions of reactants may vary over considerable range depending on the number of acyloxymethyl groups in the esterified phenol. One mol of the ester of the unsaturated acid may be employed for each such group or some of these groups may be left in the product by employing a smaller amount of the unsaturated ester. For example, one mol of 2,4,6-tris-(acetoxymethyl)-phenyl acetate may be condensed with one, two or three mols of an ester of a poly unsaturated acid such as ethyl linoleate or ethyl elaeostearate, or with one or more mols of linseed oil, tung oil, rapeseed oil, oiticica oil and the like.

The products thus obtained tend to dry when exposed to the air. They can be used directly as coating compositions or as vehicles in the preparation of paints and enamels. On account of their very low acid number they can be used with basic pigments.

The following examples will illustrate the invention—

*Example 1.*—A mixture of 88.8 grams (0.3 mol) of methyl elaeostearate (Acid No. 3.3) and 35.2 grams (0.1 mol) of 2,4,6-tris-(acetoxymethyl)-phenyl acetate is heated for 8 hours at 250—265° C. during which time 15 cc. of acetic acid is evolved. The product is a thick, dark, amber-colored oil. Its acid number is 2.2. It is soluble in petroleum naphtha.

*Example 2.*—A mixture of 90 grams (0.1 mol equivalent) of linseed oil, 36 grams (0.1 mol) of 2,4,6 tris-acetoxymethyl)-phenyl acetate and 2 grams of rosin as a catalyst, is heated for four hours at 250–255° C. during which time 14 cc. of acetic acid is eliminated. The product is a thick oil which dries on exposure to the air and can be used in the preparation of paint, varnish and enamel. The rosin which is employed as a catalyst may be replaced by one gram of litharge or any of the other catalysts listed above.

*Example 3.*—A mixture of 90 grams tung oil and 36 grams 2,4,6-tris-(acetoxymethyl)-phenyl acetate was heated at 250–255° C. with stirring in a stream of carbon dioxide. At the end of 40 minutes heating 6.5 g. acetic acid was evolved and a pale, very viscous oil obtained, which rapidly gelled upon further heating.

*Example 4.*—A mixture of 90 g. dehydrated castor oil, 28 g. tung oil fatty acids and 36 g. of 2,4,6-tris-(acetoxymethyl)-phenyl acetate was heated at 250–255° C. for 3¼ hours with stirring in a stream of carbon dioxide. At the end of this time 10 g. of acetic acid had distilled off and the residual product formed a very viscous, pale yellow oil useful as a paint or varnish vehicle. Its acid number is 7.

I claim:

1. The process which comprises heating to reacting temperatures a mixture of an esterified phenol having at least one acyloxy methyl group attached to the aromatic nucleus and an ester of a poly unsaturated higher aliphatic carboxylic acid.

2. The process which comprises heating to reacting temperatures a mixture of an esterified phenol having at least one acyloxymethyl group attached to the aromatic nucleus, said acyl group containing less than eight carbon atoms, and an ester of a poly unsaturated higher aliphatic carboxylic acid.

3. The process which comprises heating to reacting temperatures a mixture of an esterified phenol having at least one acyloxymethyl group attached to the aromatic nucleus, said acyl group containing less than eight carbon atoms, and an ester of a poly unsaturated higher aliphatic carboxylic acid of a drying oil.

4. The process which comprises heating to 200 to 300° C. 2,4,6-tris-(acetoxymethyl)-phenyl acetate with an ester of a poly unsaturated higher aliphatic carboxylic acid of a drying oil.

5. The process which comprises heating to 200 to 300° C. 2,4,6-tris-(acetoxymethyl)-phenyl acetate with an ester of linseed oil fatty acids.

6. The process which comprises heating to 200 to 300° C. 2,4,6-tris-(acetoxymethyl)-phenyl acetate with an ester of tung oil fatty acids.

7. The process which comprises heating to 200 to 300° C. 2,4,6-tris-(acetoxymethyl)-phenyl acetate with an ester of dehydrated ricinoleic acid.

8. A composition of matter resulting from the condensation of an esterified phenol having at least one acyloxymethyl group attached to the aromatic nucleus and an ester of a poly unsaturated higher aliphatic carboxylic acid.

9. A composition of matter resulting from the condensation of an esterified phenol having at least one acyloxymethyl group attached to the aromatic nucleus, said acyl group containing less than eight carbon atoms, and an ester of a poly unsaturated higher aliphatic carboxylic acid.

10. A composition of matter resulting from the condensation of an esterified phenol having at least one acyloxymethyl group attached to the aromatic nucleus, said acyl group containing less than eight carbon atoms, and an ester of a poly unsaturated higher aliphatic carboxylic acid of a drying oil.

11. A composition of matter resulting from the condensation of 2,4,6-tris-(acetoxymethyl)phenyl acetate with an ester of a poly unsaturated higher aliphatic carboxylic acid of a drying oil.

12. A composition of matter resulting from the condensation of 2,4,6-tris-(acetoxymethyl) phenyl acetate with an ester of linseed oil fatty acids.

13. A composition of matter resulting from the condensation of 2,4,6-tris-(acetoxymethyl)-phenyl acetate with an ester of tung oil fatty acids.

14. A composition of matter resulting from the condensation of 2,4,6-tris-(acetoxymethyl)-phenyl acetate with an ester of dehydrated ricinoleic acid.

HERMAN A. BRUSON.